March 31, 1970  E. E. METZGER  3,503,408
COUPLED MODE FLUID DEVICES
Filed March 7, 1966  2 Sheets-Sheet 1
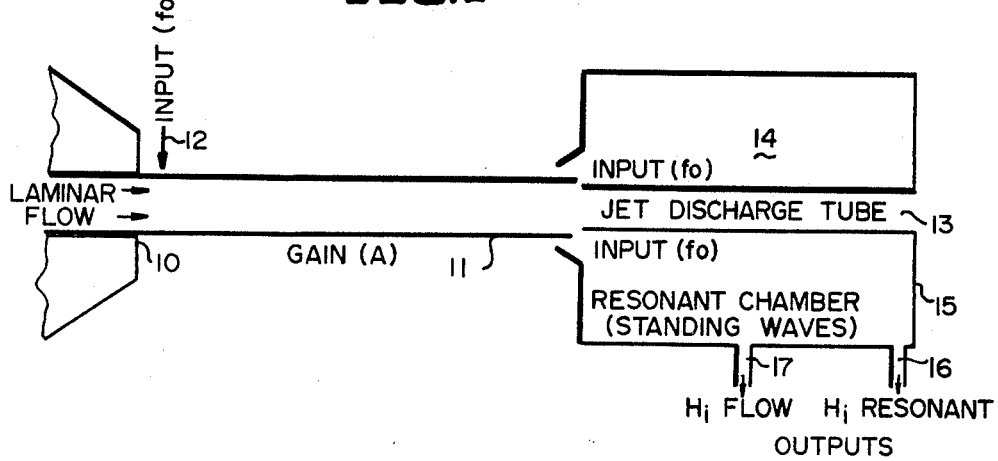
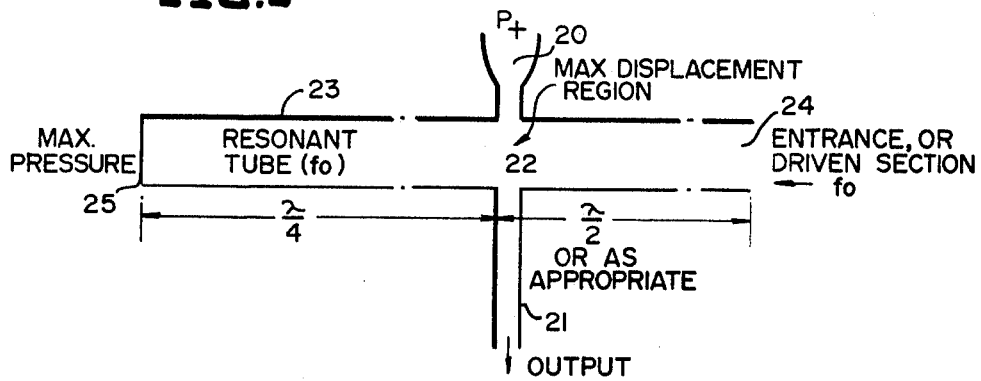
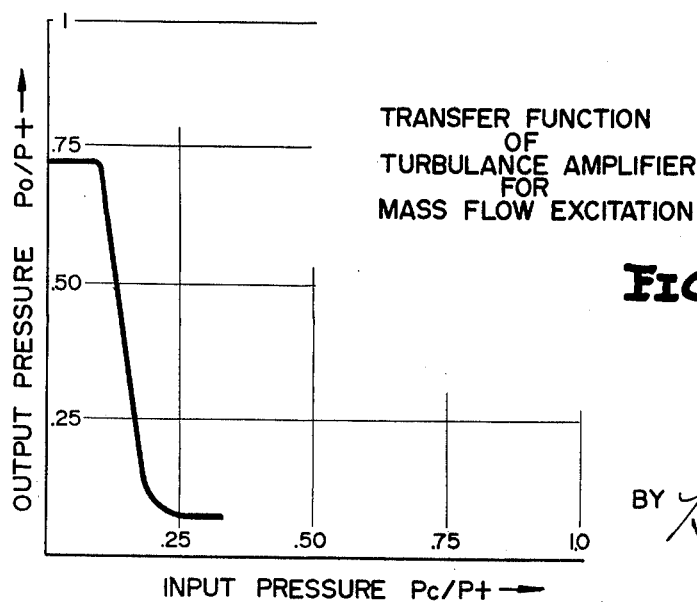
INVENTOR
ERIC E. METZGER
BY Hurvitz & Rose
ATTORNEYS March 31, 1970   E. E. METZGER   3,503,408
COUPLED MODE FLUID DEVICES
Filed March 7, 1966   2 Sheets-Sheet 2
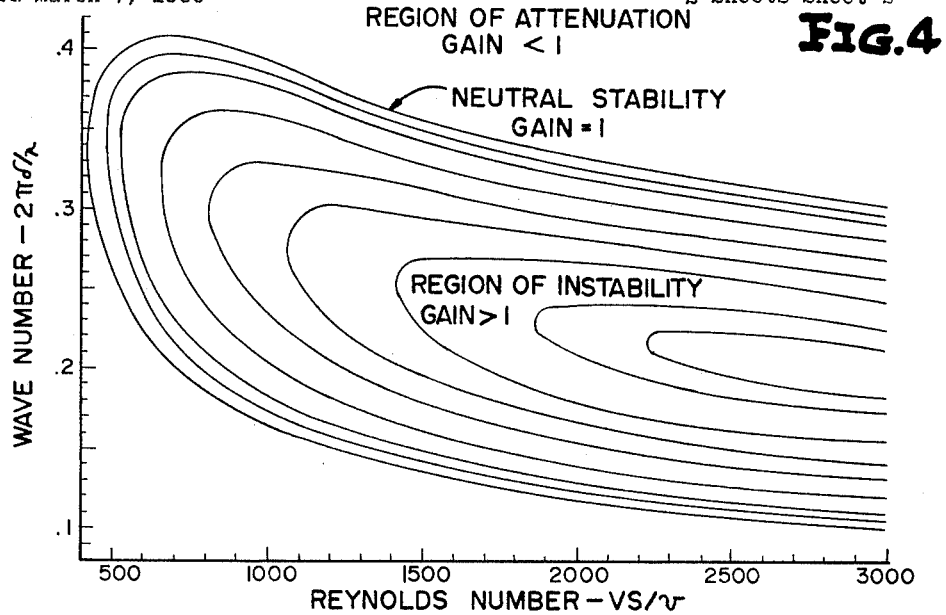
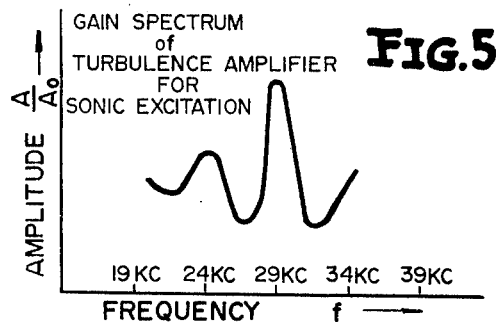
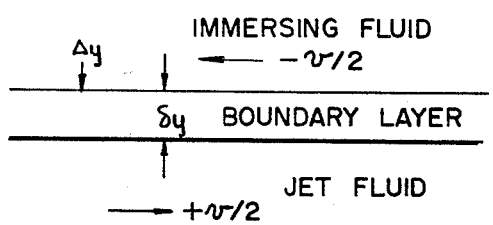
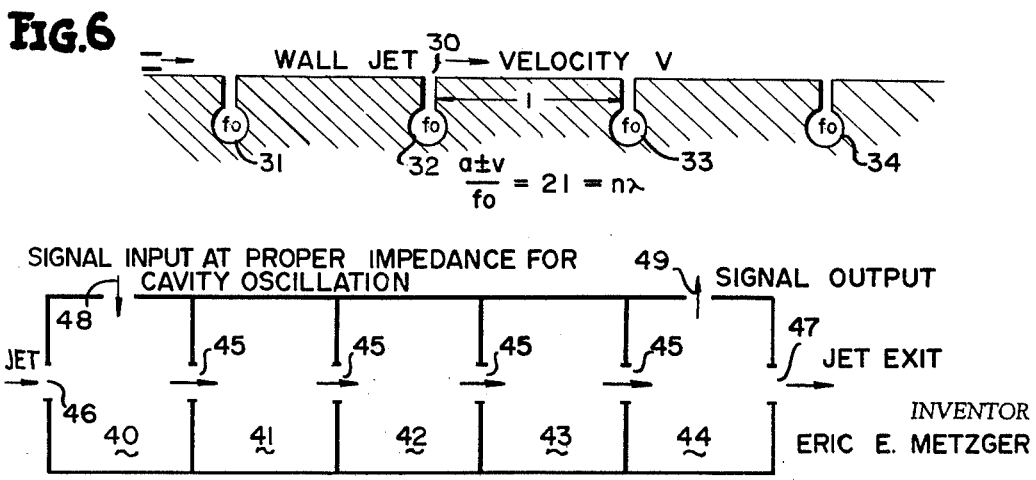
INVENTOR
ERIC E. METZGER
BY Hurvitz + Rose
ATTORNEYS United States Patent Office 3,503,408
Patented Mar. 31, 1970

3,503,408
COUPLED MODE FLUID DEVICES
Eric E. Metzger, Silver Spring, Md., assignor to Bowles Engineering Corporation, Silver Spring, Md., a corporation of Maryland
Filed Mar. 7, 1966, Ser. No. 532,385
Int. Cl. F15c 1/18
U.S. Cl. 137—81.5        13 Claims

ABSTRACT OF THE DISCLOSURE

A fluidic amplifier system which operates as a coupled mode device, a jet of fluid immersed in a medium being subjected to an acoustic disturbance which does not extend into the core of the jet, the jet interacting with a resonant structure or structures, while in a non-saturated condition.

---

The present invention relates generally to pure fluid amplifiers and more particularly to pure fluid amplifiers having streams or jets of fluid which operate, by virtue of stream or jet structure, as coupled mode amplifiers.

In electronic devices, the coupled mode approach has produced such devices as the backward wave oscillator and the traveling wave tube, which have extremely low noise figures. The amplification mechanism of such devices depends on the existence of two interacting wave supporting entities, one an electron beam and the other a conductive helix capable of supporting electrical waves and energy transfer from one to the other. The interaction mechanism is the electromagnetic field.

In an analogous manner, both the body or core and the boundary layer of a fluid jet or stream can support unsteady signals, and an interaction mechanism is available in the shear stress. Calculation indicates that a 1 cm. wavelength in air corresponds to a frequency of 33½ kc., for disturbances traveling at the velocity of sound. The prime example of a device which can operate as a coupled mode fluid amplifier is the turbulence amplifier, which is well known per se, but has not heretofore been considered as a coupled mode device. The turbulence amplifier is capable of amplifying a 30 kc. signal, but dependence has heretofore been placed on the saturation behavior of the amplifier, which degrades frequency response.

It is an object of the present invention to provide novel coupled mode fluid amplifiers.

It is another object of the invention to provide a coupled mode fluid amplifier wherein a jet is coupled with a resonant fluid volume.

A further object of the invention resides in the provision of a resonant cavity, through which is passed a fluid jet, disturbed by a fluid signal containing at least one component to which the cavity is resonant.

Still another object of the invention resides in the provision of a fluid amplifier employing a wall jet coupled to plural cavities, or an immersed jet coupled to plural cavities, wherein the locations of the cavities in terms of frequency of a desired signal is such as to amplify the desired signal and to discriminate against signals of frequencies and phases different from the desired signal.

In accordance with a first embodiment of the invention, a jet of fluid is disturbed by a fluid signal. The jet has a Reynolds number such that an unsteady signal is conserved or is amplified in traveling along the jet. The core of the jet is removed, while the boundary layer, wherein the signal primarily subsists, is collected by a cavity resonant at the frequency of the signal. The cavity tends to enhance the desired or input signal and to damp noise, i.e. frequencies outside a desired band. Signal can be derived from the cavity, from standing waves set up therein, either centrally thereof, where high velocity signals exist, or near a wall, where high pressure signals exist.

In accordance with a modification of the first described embodiment, a jet of fluid is caused to flow transversely of a tube having a resonant length, an open mouth or input, and a reflecting or closed termination. Fluid signal at frequency $f$ is applied to the input, setting up standing waves. The transverse jet passes through an antinode of the fluid displacement wave in the tube, at frequency $f$, being located an odd number of quarter waves from the termination and an even number of quarter waves from the input. The jet is accordingly modulated at signal frequency, if turbulent or capable of sustaining a steady signal and in turn reacts on the standing waves in the tube.

In accordance with a third embodiment of the invention, a jet is passed through a chain of resonant cavities in sequence. If a signal is introduced into the cavity chain, for example, an acoustic signal at frequency $f$, and if the cavities are joined end to end by apertures, the chambers will resonate with maximum displacement at the apertures and maximum pressure at the cavity centers. Since the cavities possess Q values, i.e., inertance and capacitance, an effective time delay of the disturbed jet relative to the acoustic velocity exists, and therefore an amplification of energy can occur, by a mechanism which is typical of coupled mode electronic devices, such as traveling wave tubes. The cavities in such case play the part of the helix of a traveling wave tube and the jet plays the part of an electron stream.

In accordance with still another embodiment of the invention, a jet is bounded by a wall containing suitably spaced resonant structures.

Reference is made to my application for U.S. Patent Ser. No. 435,168, filed Feb. 25, 1965, and entitled Turbulence Amplifier and Circuits, assigned to the assignee of the present invention. In that application is discussed various configurations of amplifiers which depend on phenomena associated with turbulence for their amplifying properties. Various of the turbulence amplifiers disclosed in that application may be considered per se coupled mode amplifiers, in the sense that the core of a jet is coupled with a turbulent boundary layer, and proper operating conditions exist. However, in accordance with the present application means are provided for enhancing coupling, and thereby increasing gain, for reducing noise and undesired signals by associating resonators with the turbulent jet, and for adopting other techniques which enhance the utility of turbulence amplifiers. A turbulence amplifier can be considered, in its bistable configuration, one which proceeds between a stable state and an unstable state, i.e., its gain eventually becomes so great that oscillations occur, so that at a given point along the jet, no core remains. It is well known that a plot of ootput signal versus power signal for a jet contains the equivalent of a negative resistance region in an electrical device, and therefore that instability can exist in such devices. Since signals can be inserted at a location farther upstream, high gain can be expected.

According to the present invention, then, the coupled mode effects which are inherent in suitably designed turbulence amplifiers are enhanced by utilizing resonance effects.

It is, accordingly, a broad object of the invention to provide coupled mode pure fluid amplification.

It is a further object of the invention to provide a coupled mode amplifier in which resonance effects are employed to enhance amplification over a narrow band of frequencies, and to remove noise outside that band.

The above and still further objects, features and advantages of the present invention will become apparent upon consideration of the following detailed description of one specific embodiment thereof, especially when taken in conjunction with the accompanying drawings, wherein:

FIGURE 1 is a schematized view of a system according to the invention;

FIGURE 2 is a schematized view of a further embodiment of the invention;

FIGURE 3 is a plot of transfer function of a turbulence amplifier;

FIGURE 4 is a plot showing stream characteristics of wave member is versus Reynolds number of a stream;

FIGURE 5 is a typical plot of gain versus frequency for a stream operated in the coupled mode;

FIGURES 6 and 7 are further modifications of the invention, illustrated in conventionalized fashion; and FIGURE 8 is a conventionalized view of a jet of fluid, subject to a signal, useful in explaining the theory of operation of coupled mode devices.

In FIGURE 1, 10 is a form of nozzle which produces a laminarly flowing stream or jet of fluid 11 in an immersing medium. For example, the stream or jet 11 may be gaseous, or liquid or a combination of both, and the immersing fluid may not or may be the same as the jet fluid. The jet or stream 11 is subjected to a disturbance by a flow of control fluid, gas, liquid or combination, issuing from a nozzle or channel 12, located adjacent the outlet of nozzle 10. The disturbance represents an input signal $f_0$. That signal may be a steady acoustic signal at one or more frequencies, or it may be in pulsed form. In any event, the signal travels along the jet 11 at an acoustic velocity $a$, on which is superposed the velocity of the jet, V, and in general the signal travels on or near the boundary of the jet initially, but in the course of traveling down the jet the signal spreads inwardly of the jet and outwardly into the immersing medium. The amplitude of the signal is then found to increase in progressing down the jet, until, if the jet is sufficiently long, the jet becomes turbulent.

In accordance with the invention, the core of the jet, which is disturbed by the signal not at all or only relatively slightly, is then removed by a jet discharge tube 13. But the signal bearing part of the jet is collected in a resonant chamber or cavity 14.

The chamber 14 is resonant to a frequency contained in the signal, or to a narrow band of frequencies. These, then are accentuated in a chamber or cavity 14 and set up standing waves therein. A pressure wave of output is then available adjacent or at a boundary wall 15 of the cavity 14, which may be removed by a channel 16, and a flow output is available centrally of the chamber and is available at channel 17, depending upon the mode structure inside the cavity.

Coupling of the signal bearing jet 11 with the resonant cavity or chamber 14, thus results in an amplified signal. Amplification results from interaction between the jet and its surrounding medium, and the amplification is of the acoustic signal at the expense of the energy of the jet represented by laminar flow.

In FIGURE 2 a jet of fluid flows from a P+ region, or pressure source 20, to a collection channel 21 via a gap 22. The Reynolds number for the flow is selected to enable enhancement of signals applied to the jet in the gap 22, but the gap is of insufficient length to permit complete turbulence to develop.

A resonant tube 23 extends transversely of the gap 22. The tube 23 has an open end 24 into which acoustic energy can be inserted, and a remote closed end 25. The distance from the closed end 25 to the gap 22 is an odd number, including one, of quarter wave lengths, while the distance from the gap 22 to the open end 24 is a number of half wavelengths, including one, at the frequency $f_0$ of the acoustic energy.

Due to wavelength considerations in tube 23, the gap 22, and the jet crossing that gap, find themselves in a maximum displacement region at the frequency $f_0$. As one departs from $f_0$ this is no longer true. Accordingly, the jet in the gap 22 will be subjected to maximum disturbance by signal at frequency $f_0$, and immediately adjacent frequencies, and resonance is utilized to provide a very large signal at gap 22 in response to a small input signal at entrance 24 by utilizing a high Q tube. The bandwidth of the system can be decreased by increasing the number of quarter wave lengths in tube 23.

Collection channel 21 can provide an output signal, which can be used as an input or control signal in the structure of FIGURE 1, or which can be utilized directly, or which can provide a modulated jet for application to a resonant chamber, as 14 of FIGURE 1, from which outputs can be derived as in FIGURE 1.

In the turbulence amplifier, a flow, such as a free jet, or a wall jet, is generated at a Reynolds number such that laminar behavior exists from the jet source to its receiving aperature. For nozzle Reynolds numbers in the region from 100 to 2500, a laminar free jet proves to be sensitive to disturbances to a varying degree, depending on the Reynolds number and disturbance frequency. If inputs of sufficient amplitude are applied to the stream, a transition to turbulence will occur in the boundary layer, and a greatly amplified change in output pressure is experienced. FIGURE 3 shows the variation in output pressure with control pressure for an air jet turbulence amplifier under conditions wherein the input is applied over a very limited length of the jet. Water operation leads to a similar curve at appropriate liquid pressures and properly scaled Reynolds number.

The turbulence sensor can be viewed as a means for using Tollmien-Schlichting instabilities in a flowing fluid to control turbulent transition. In the language favored by electronics and control systems people, the boundary layer has an amplification factor, which results in a signal gain. Because of its demonstrated frequency dependent properties, the gain of the turbulence sensor can be considered to exhibit frequency dependence. The cause of this frequency dependence is discussed hereinafter.

Instabilities in the turbulence sensor "input," i.e., boundary layer instabilities of a given frequency, will be amplified if they lie in the high gain domain, or attenuated if they lie in the low gain domain. The presence of instabilities of frequencies which fall into a high gain region of the amplifier gain spectrum will give rise to jet instabilities of sufficient amplitude to cause turbulent transition and a significant change in output pressure. For a given frequency, the input amplitude required to produce a given extent of transition from laminar to turbulent flow depends on both jet length and Reynolds number. As a saturation limits electronic amplifier gain and sensitivity, so does complete transition to turbulence limit turbulence sensor gain and sensitivity. The turbulence sensor is, in fact, one form of a saturating coupled mode amplifier, and may be used as a bistable device by being carried into and out of saturation as are electronic and magnetic digital circuits.

Turbulence sensor sensitivity is greatly increased by application of the control signal over the entire jet length rather than to only a local segment of the jet. Since the frequency dependence of turbulence sensors can be controlled by the sensor's design, such a sensor may be used to discriminate between those which uniquely represent signals. Thus, even though a signal may lie within the threshold level, by designing appropriate frequency discrimination into the detector, parts of the signal may be chosen for detection which are significantly different in frequency from that of the background. This means that far lower threshold signals can be detected in this manner than can be detected by an integrating sensor or a system which does not utilize frequency discrimination.

The Navier-Stokes equations, when simplified for small perturbations, leads to the Orr-Sommerfeld equation as a description of fluid behavior. Solutions of this equation are presented in FIGURE 4 in graphical form, as a function of two parameters: The Reynolds number $V\delta/\nu$, and the dimensionless wave number, $2\pi\delta/\lambda$. This figure illustrates the stability distribution in Reynolds number at various frequencies.

Any jet flow leaves a nozzle with some degree of residual instability. This instability can be considered to consist of two categories: jet body instability and surface instability. The wave length of this instability and the nature of the jet determine the degree of amplification of the disturbance. The amplification and frequency character are defined by the Orr-Sommerfeld equation diagrammed in FIGURE 4.

If the disturbance is of a wave length that is amplified, then the most minute initial disturbance will eventually result in transition to turbulence. This turbulence will grow until it completely consumes the laminar jet.

The degree of initial instability and its frequency determines the distance a jet can be projected before onset of turbulence; that is, the analog range of the amplifier.

In jet flow, the $\delta$ can be taken as half the jet width. $\alpha$ is defined as $2\pi/\lambda$ when $\lambda$ is the disturbance wavelength.

The nature of jet flow is such that there is an inflection point in the boundary velocity profile. This means that as the Reynolds number increases toward $\infty$, the unstable region is unbounded as shown in FIGURE 4. This is similar to the case of frictionless unstable flow. As a result, when the jet is operating at high Reynolds numbers, the various effects are negligible and can be discounted. Low Reynolds number operation is indicated.

Disturbances originated within a nozzle or its approach section are distorted by passage through the nozzle. There is some controversy over the nature of this distortion, but it is believed that disturbances in the direction of flow are stretched while disturbances normal to the flow are compressed in scale.

As the free jet turbulence amplifier design utilizes an axially symmetric nozzle configuration, the inlet velocity component $V_1$, and the outlet velocity component $V_2$ can be considered to be related by the areas so that, for low Mach numbers, $$V_1 A_1 = V_2 A_2$$
$$V_1 d_1^2 = V_2 d_2^2$$
$$V_1 \left(\frac{d_1}{d_2}\right)^2 = V_2$$

Thus a disturbance upstream of the nozzle will be contracted in scale by a factor $$\left(\frac{dz}{d_1}\right)^2$$

at the exit end of the nozzle structure. Such disturbances must be minimized, as we wish the jet to be sensitive dominantly to disturbances introduced by the external flow field after the jet has left the nozzle.

It is apparent that the jet instability can be designed to be frequency discriminating. An array of such sensors can be utilized to look for frequency patterns, a typical plot of gain vs. frequency being included in FIGURE 5.

A technique which offers a sophisticated method for sensing disturbances is the coupled mode amplifier. A view of one such device is shown in FIGURE 6.

The coupled mode amplifier is a displacement sensor, and actually measures and amplifies displacements in its power jet boundary layer. Gains for such devices of $10^6$ are available in narrow frequency bands. It is a unique characteristic of the coupled mode amplifier that its operation is strongly frequency dependent and that it will reject extraneous frequencies and concentrate all of its amplifying power in a narrow frequency band. It is suitable, therefore, as an analog frequency detecting element unique in the fluid field. The high gain available further offers the possibility of selecting critical frequency components and their amplitudes only. Again, the critical question with the coupled mode amplifier is the threshold sensitivity and its relationship to the steady state background noise. Amplifiers of this type offer detection possibilities which cannot be approached by other devices.

In this sensor, a wall jet 30 and set of cavities 31, 32, 33, 34 are arranged such that the boundary layer mode must couple to the wall mode, which is defined by the set of resonators, which are tuned to a frequency $fo$, and which are separated by a distance $l$, as in FIGURE 6. Because of the wall structure, a constraint $$\frac{a \pm V}{fo} = 2l$$

is applied to the system, where $a$ is the instability, or signal, propagation velocity.

An understanding of the amplification process may be derived from the following description:

When the flow begins, its appearance sets the first of the resonators, 31, into oscillation. Some of the energy, or energy of oscillation, from the first oscillator is radiated into the passing fluid flow. Since the second oscillator, 32, is also brought into oscillation by the passing flow, an interaction results between the emitted wave from the first oscillator and the oscillation of the second oscillator. As a result, the peaks and valleys in the pressure at the second resonator 32 exit will become synchronized with the peaks and valleys of the pressure wave at the first resonator 31 exit by the radiated energy from the first resonator 31. Such a condition will be propagated along the row of resonators in the direction of flow, i.e., the forward direction. All the resonators are thus coupled together by a "forward" wave moving in the direction of flow.

Clearly, however, there is also a radiated wave traveling upstream. This "backward" wave will cause considerable difficulty unless proper care is taken, because the sum of the velocity of the fluid, V, and the velocity of propagation of the oscillating radiated waves within the fluid, $a$, is not the same for both forward and backward directions. The velocity of propagation relative to the row of resonators is a $+V$ for the forward wave, and a $-V$ for the backward wave. Since the separation between resonators must be fixed at $d$, there are now two separate conditions which must be met in order to have a set of synchronized oscillators resonate at frequency $fo$.

A well known solution for a standing wave pattern is:

$$\frac{\omega l}{a} = n\pi$$

where $\omega$ is the angular frequency in radians/sec. $\omega = 2\pi f$
$l$ is the length over which the standing wave exists.
$a$ is the velocity of propagation of the wave in the medium.
$n$ is the number of half-wave lengths in the distance.
$\pi$ is the phase shift in one-half wavelength.

Literally, this may be demonstrated as follows:

$$aT = \lambda \quad (\text{velocity} \times \text{Time} = \text{distance})$$

where T is the period, and $\lambda$ is the wavelength of a wave of frequency $f = \omega/2\pi$.

Rewriting, $$\frac{a}{f} = \lambda = \frac{2\pi a}{2\pi f} = \frac{2\pi a}{\omega}$$

$$\therefore \frac{\omega}{a} = \frac{2\pi}{\lambda}$$

a well known result.

Rewrite $$\frac{\omega}{a} = \frac{2n\pi}{n\lambda}$$

where $n$ is an integer.

Now, let $$l = \frac{n\lambda}{2} \text{ and } \frac{\omega}{a} = \frac{n\pi}{l}$$

or $$\frac{\omega l}{a} = n\pi$$

Here $l = n\lambda/2$ is the boundary condition.

The boundary condition reflects the fact that $n$ half wavelengths fit into the distance, $l$, when maximum coupling occurs.

When the fluid through which the disturbance moves is also in motion with its own velocity, $V$, then the equation $$\frac{\omega l}{a} = n\pi$$

must be modified into two new equations:

$$\frac{\omega l}{a+v} = n_f \pi \quad \text{(Forward wave)}$$

$$\frac{\omega l}{a-v} = n_b \pi \quad \text{(Backward wave)}$$

These are two waves, both of which must satisfy the same boundary conditions, and differ from the preceding case only when coupling to a structure moving relative to the transmitting medium.

Solving these two equations simultaneously by adding, $$\frac{\omega l}{a} = \frac{n_f + n_b}{2}\left(1 - \frac{v^2}{a^2}\right)\pi \quad l = \frac{n\lambda}{2}$$

When $V=0$, $n_f = n_b$, and $$\frac{\omega l}{a} = n\pi$$

as before.

Consider some examples:
Define: $n_b \equiv x n_f \times \geq 1$ $$\therefore n_f + n_b = (1+x)n_f \quad \text{Let } n_f = n$$

$$\frac{\omega l}{a} = \frac{(1+x)n}{2}\left(1 - \frac{V^2}{a^2}\right)\pi$$

Let $x = 1$;

$$\therefore \frac{\omega l}{a} = n\pi \left(1 - \frac{V^2}{a^2}\right)$$

Solving for $V$, $$\frac{\omega l}{n\pi a} = 1 - \frac{v^2}{a^2}$$

$$1 - \frac{\omega l}{n\pi a} = \frac{v^2}{a^2}$$

$$V^2 = a^2\left(1 - \frac{\omega l}{n\pi a}\right)$$

$$V = \pm a \sqrt{1 - \frac{\omega l}{n\pi a}}$$

$V$ is real only when $$\frac{\omega l}{n\pi a} \geq 1$$

for the equality, $V=0$ and $$\omega = \frac{an\pi}{l} \text{ or } f = \frac{\omega}{2\pi} = \frac{an}{2l}$$

otherwise, $$\frac{\omega l}{a} > n\pi$$

If $a = 1120$ ft./sec., and $l$ is about 1 inch, or $\frac{1}{12}$ foot, $$\frac{l}{a} = \frac{1/12 \text{ ft}}{1120 \text{ ft/sec}} = \frac{1}{13.44 \times 10^3} \text{ sec.}$$

TABLE I

| $n$ | $f = \frac{n}{2}\left(\frac{a}{l}\right)$ | |
|---|---|---|
| 1 | 6.71 kc. | |
| 2 | 13.44 kc. | (Ordinary harmonics) |
| 3 | 20.15 kc. | |

For each $n$, $$V = \pm a\sqrt{1 - \frac{\omega l}{n\pi a}}$$

Thus, for each value of $n$, there is a value of $\omega$. In addition, for each value of $n$, as $V$ increases from zero, $\omega$ will increase as $V^2$. Now consider the effect of $x > 1$:

$$\frac{\omega l}{a} = (1+x)\frac{n}{2}\left(1 - \frac{V^2}{a^2}\right)\pi$$

$$\therefore \frac{V^2}{a^2} = 1 - \frac{2\omega l}{n\pi a(1+x)}$$

and $$V = \pm a\sqrt{1 - \frac{2\omega l}{n\pi a(1+x)}}$$

$n, x = 1, 2, 3 \ldots$

Return for a moment to the definition $$n_b \equiv x n_f$$

Since $l$ is fixed, and $\omega$ is fixed, this condition implies a relationship between $a+V$ and $a-V$. Dividing the forward wave equation by the backward wave equation, $$\frac{n_b}{n_f} = x = \frac{a+V}{a-V}$$

$$\therefore a+V = x(a-V) = xa - xV$$

and $$v = a\left(\frac{x-1}{x+1}\right)$$

TABLE II

| x | x−1 | x+1 | x−1/x+1 | V |
|---|---|---|---|---|
| 1 | 0 | 2 | 0 | V=0 |
| 2 | 1 | 3 | 1/3 | V=1/3a |
| 3 | 2 | 4 | 1/2 | V=1/2a |
| 4 | 3 | 5 | 3/5 | V=3/5a |
| 5 | 4 | 6 | 2/3 | V=2/3a |
| 6 | 5 | 7 | 5/7 | V=5/7a |
| 7 | 6 | 8 | 3/4 | V=3/4a, etc. |

Now, $$\frac{\omega l}{a} = (1+x)\frac{n}{2}\left(1 - \frac{V^2}{a^2}\right)\pi$$

Where, $x, n = 1, 2, 3, \ldots$
Since $$V = a\left(\frac{x-1}{x+1}\right)$$

$$\frac{V^2}{a^2} = \frac{(x-1)^2}{(x+1)^2}$$

and $$1 - \frac{V^2}{a^2} = \frac{4x}{(1+x)^2}$$

Now, $$\frac{\omega l}{a} = (1+x)\frac{n}{2}\left(1 - \frac{V^2}{a^2}\right)\pi$$

Substituting, $$(1+x)\frac{n}{2}\left(1 - \frac{V^2}{a^2}\right)\pi = (1+x)\frac{n}{2}\left(\frac{4x}{(1+x)^2}\right)\pi$$

and $$\frac{\omega l}{a} = \frac{2\pi n x}{x+1}$$

$x, n = 1, 2, 3 \ldots$

When $x=1$, $V=0$, and $\omega l/a = n\pi$ as before.

When $$\frac{a}{l} = 13.44 \times 10^3 \text{ sec}^{-1}$$

as above, then, since $$\omega = \frac{a}{l}\left(\frac{2\pi n x}{x+1}\right)$$

$$f = a/l(nx/x+1)$$

TABLE III

| n | x | nx | x+1 | nx/x+1 | f | x−1 | x−1/x+1 | V |
|---|---|----|-----|--------|------|-----|---------|-----|
| 1 | 1 | 1 | 2 | 1/2 | 6.71 | 0 | 0 | 0 |
| | 2 | 2 | 3 | 2/3 | 8.95 | 1 | 1/3 | a/3 |
| | 3 | 3 | 4 | 3/4 | 10.05 | 2 | 1/2 | a/2 |
| 2 | 1 | 2 | 2 | 1 | 13.44 | 0 | 0 | 0 |
| | 2 | 4 | 3 | 4/3 | 17.9 | 1 | 1/3 | a/3 |
| | 3 | 6 | 4 | 3/2 | 20.15 | 2 | 1/2 | a/2 |
| 3 | 1 | 3 | 2 | 3/2 | 20.15 | 0 | 0 | 0 |
| | 2 | 6 | 3 | 2 | 26.85 | 1 | 1/3 | a/3 |
| | 3 | 9 | 4 | 9/4 | 30.22 | 2 | 1/2 | a/2 |

Returning to fundamental principles, $$aT = \lambda \text{ where } T = l/f$$

$$\therefore a = \lambda f \text{ or } a/f = \lambda$$

Since $2\pi f = \omega$, $$\frac{\omega}{a} = \frac{2\pi f}{a} = 2\pi \frac{1}{a/f} = \frac{2\pi}{\lambda}$$

The boundary condition for in-phase operation of the oscillator with an amplified standing wave is $l = n\lambda/2$; that is, a fundamental distance exists in the oscillator which is an integral number of half wavelengths long. Naturally, an out of phase component could also be written down, which would, however, decay:

$$l = \frac{n\lambda}{2} + \frac{\lambda}{4} = (n + \tfrac{1}{2})\frac{\lambda}{2}$$

Now, applying this to the case where the velocity of propagation, $a$, is modified by a superimposed velocity, $V$, due to a velocity of the medium. Then $$\frac{\omega}{a \pm v} = \frac{2\pi}{\lambda}$$

For the forward wave, write $$\frac{\omega}{a+V} = \frac{2\pi}{\lambda};\ l = n_f + \tfrac{1}{2}\frac{\lambda}{2}$$

For the backward wave, write $$\frac{\omega}{a-V} = \frac{2\pi}{\lambda};\ l = \frac{n_b}{2}\lambda$$

Carrying out the indicated substitutions, $$\frac{\omega}{a+V} = (n_f + \tfrac{1}{2})\frac{\pi}{l}$$

$$\frac{\omega}{a-V} = \frac{n_b \pi}{l}$$

Rewriting, $$\frac{\omega l}{a+V} = (n_f + \tfrac{1}{2})\pi$$

$$\frac{\omega l}{a-V} = n_b \pi$$

Dividing, $$\frac{a+V}{a-V} = \frac{n_b}{n_f + \tfrac{1}{2}}$$

Let $n_b = x n_f = xn$

Then $$\frac{a+V}{a-V} = \frac{xn}{n + \tfrac{1}{2}} = \frac{1}{A}$$

Solving for V, $a - V = A(a+V) = Aa + AV$, and $$V = \frac{a(1-A)}{1+A}$$

$$\frac{1-A}{1+A} = \frac{(x-1)n - \tfrac{1}{2}}{(x+1)n + \tfrac{1}{2}}$$

$$\therefore V = a\left[\frac{n(x-1) - \tfrac{1}{2}}{n(x+1) + \tfrac{1}{2}}\right]$$

$n, x = 1, 2, 3 \ldots$

Adding the equations for the forward and backward waves, $$\omega l\left(\frac{1}{a+V} + \frac{1}{a-V}\right) = (n_f + \tfrac{1}{2})\pi + n_b \pi = \pi(n_f + n_b + \tfrac{1}{2})$$

$$\omega l\left(\frac{2a}{a^2 - V^2}\right) = \pi[(1+x)n + \tfrac{1}{2}]$$

where $n_b = x n_f = xn$.

$$\frac{\omega l}{a} = \frac{\pi}{2}[n(x+1) + \tfrac{1}{2}]\left(1 - \frac{V^2}{a^2}\right)$$

From above, $$V = a\left[\frac{n(x-1) - \tfrac{1}{2}}{n(x+1) + \tfrac{1}{2}}\right]$$

$n, x = 1, 2, 3 \ldots$

Now $$1 - \frac{V^2}{a^2} = \left[\frac{n(x-1) - \tfrac{1}{2}}{n(x+1) + \tfrac{1}{2}}\right]^2$$

$$= \frac{2nx(2n+1)}{[n(x+1) + \tfrac{1}{2}]^2}$$

Now $$\frac{\omega l}{a} = \frac{\pi}{2}[n(x+1) + \tfrac{1}{2}] \cdot \frac{2nx(2n+1)}{[n(x+1) + \tfrac{1}{2}]^2}$$

$$= \frac{2\pi nx(n + \tfrac{1}{2})}{n(x+1) + \tfrac{1}{2}}$$

$$\therefore f = \frac{nx(n + \tfrac{1}{2})}{n(x+1) + \tfrac{1}{2}}$$

TABLE IV

| n | x | nx | n+½ | nx(n+½) | x+1 | n(x+1) | n(x+1)+½ | f |
|---|---|----|-----|---------|-----|--------|----------|-----|
| 1 | 1 | 1 | 3/2 | 3/2 | 2 | 2 | 5/2 | 3/5 a/l |
| | 2 | 2 | 3/2 | 3 | 3 | 3 | 7/2 | 6/7 a/l |
| | 3 | 3 | 3/2 | 9/2 | 4 | 4 | 9/2 | 1 a/l |
| 2 | 1 | 2 | 5/2 | 5 | 2 | 4 | 9/2 | 10/9 a/l |
| | 2 | 4 | 5/2 | 9 | 3 | 6 | 13/2 | 18/13 a/l |
| | 3 | 6 | 5/2 | 15 | 4 | 8 | 17/2 | 30/17 a/l |
| 3 | 1 | 3 | 7/2 | 21/2 | 2 | 6 | 13/2 | 21/13 a/l |
| | 2 | 6 | 7/2 | 21 | 3 | 9 | 19/2 | 42/19 a/l |
| | 3 | 9 | 7/2 | 63/2 | 4 | 12 | 25/2 | 63/25 a/l |

TABLE V

| n | x | nx (n+½)/n(x+1)+½ | f (kc.) | f (kc.) |
|---|---|---|---|---|
| 1 | 1 | 3/5 | 8.06 | 6.71 |
| | 2 | 6/7 | 11.6 | 8.95 |
| | 3 | 1 | 13.44 | 10.05 |
| 2 | 1 | 10/9 | 14.98 | 13.44 |
| | 2 | 18/13 | 18.62 | 17.9 |
| | 3 | 30/17 | 23.8 | 20.15 |
| 3 | 1 | 21/13 | 21.8 | 20.15 |
| | 2 | 42/19 | 29.8 | 26.85 |
| | 3 | 63/25 | [1] 33.85 | [2] 30.22 |

[1] Backward Wave only.
[2] Both Waves.

Naturally, to achieve these frequencies, a specified flow velocity, V, is required, as shown below:

TABLE VI

| n | x | x−1 | n(x−1)−½ | x+1 | n(x+1)+½ | n(x−1)−½/n(x+1)+½ | V | V |
|---|---|---|---|---|---|---|---|---|
| 1 | 1 | 0 | −1/2 | 2 | 5/2 | −1/5 | | 3 |
| | 2 | 1 | +1/2 | 3 | 7/2 | +1/7 | a/7 | a/0 |
| | 3 | 2 | 3/2 | 4 | 9/2 | +1/3 | a/3 | a/2 |
| 2 | 1 | 0 | −1/2 | 2 | 9/2 | −1/9 | | 0 |
| | 2 | 1 | 3/2 | 3 | 13/2 | +3/13 | 3a/13 | a/3 |
| | 3 | 2 | 7/2 | 4 | 17/2 | +7/17 | 7a/17 | a/2 |
| 3 | 1 | 0 | −1/2 | 2 | 13/2 | −1/13 | | 0 |
| | 2 | 1 | 5/2 | 3 | 19/2 | +5/19 | 5a/19 | a/3 |
| | 3 | 2 | 11/2 | 4 | 25/2 | +11/25 | [1] 11a/25 | [2] a/2 |

[1] Backward Wave Only.
[2] Both Waves.

The calculations carried out above apply to air. Based on the velocity of sound in water, the separation of the resonant elements in the wall would have to be five inches to achieve the same frequencies. The critical problem, however, is the required fluid velocity, which is intimately related to signal propagation velocity. It is this velocity, which has been assumed the acoustic velocity for the purposes of calculation, which must be re-established in the working fluid. For vorticity in liquids, the velocities encountered will be less than .01a, estimated from wake and jet spread rates, so that fluid velocities of below 50 feet/second will be in the right range.

The material above shows that many frequencies may be amplified by a single sensor. As a consequence, a method must be provided to isolate the desired components from those not desired. As in electronic devices, a tuned cavity may be utilized to provide harmonic rejection.

The best frequencies will be those lowest harmonics for which the frequency separation, and therefore the ease of harmonic rejection, is greatest.

The amplification mechanism which can exist in a turbulence amplifier may be explained as follows, by reference to FIGURE 8, the plot of a frequency characteristic being shown in FIGURE 5.

Assume a jet in an immersing fluid with velocity $v$ relative to that fluid. Assume that the jet mach number is small, so that the flow can be considered incompressible. Between the jet and the immersing fluid there must exist a boundary, which has the velocity of the jet at one edge, and zero velocity at the other. If a transformation is made from a coordinate system in which the immersing fluid is at rest, and the jet has a velocity $v$, to one in which the boundary layer has an average velocity of zero, then, in the new coordinate system the jet velocity is $v/2$, the immersing fluid velocity is $-v/2$ and the center of the boundary layer becomes a center of symmetry as shown in FIGURE 8. The thickness of the layer is chosen $\delta y$, and constant.

Assume, now, that a disturbance $\Delta y$ perpendicular to the boundary layer occurs at its contact with the immersing medium. This disturbance represents a deflection in the boundary layer edge, and is assumed to propagate at a velocity equal to the velocity of sound, $c$. The transit time of this disturbance across the boundary layer will be $$T = \frac{\delta y}{c}$$

Since the average velocity of the boundary layer is zero, the disturbance $\Delta y$ reaches the opposite edge of the boundary layer directly below its original contact point as shown in FIGURE 8.

If the Reynolds Number of this flow is such that disturbances are amplified, in the boundary layer, then the disturbance $\Delta y$ will have been amplified in the transition across the boundary by an amplification factor, A, to $A\Delta y$. This displacement $A\Delta y$, is in its turn transmitted across the boundary layer, reaching the initial point with an amplitude $A^2\Delta y$, in a time $2\delta y/c$. The net effect of this process has been to amplify the original disturbance from $\Delta y$ to $A^2\Delta y$, in a time interval $2\delta y/c$, at the original location relative to the boundary layer. During this interval $2\delta y/c$, the disturbance point will have been displaced relative to the power nozzle by $$x = +\frac{v}{2}\frac{2\delta y}{c} = \frac{\delta y v}{c}$$

Though the above discussion is not rigorous, it illustrates the amplification mechanism. Further, it shows that, for periodic disturbances, some frequencies will not be amplified because of disadvantageous phase shifts in the boundary layer transition. Thus, if the period of an oscillatory disturbance is such that two boundary layer transitions are equal in time to a 180° phase shift, then the signal on returning will be $\Delta y - A^2\Delta y = (1-A^2)\Delta y$. If $A=1$ (Neutral Stability) then frequency selective damping will occur where the Period is $$\frac{T}{2} = \frac{2\delta y}{c} \text{ or } T = \frac{4\delta y}{c}$$

so that $$f = \frac{c}{4\delta y}$$

If A is very large, there should be no frequency effects. In practice, some frequency effects occur, more pronounced at higher frequencies, which indicate that $\delta y$ is not fixed, and $$A \gtreqqless 1$$

As in electronic devices, a small amplification factor does not necessarily mean a small amplifier circuit gain. Other consequences of this model are that the gain depends on jet velocity, and that sharp frequency characteristics depend on uniform boundary layer thickness.

A further type of coupled mode device is the coupled cavity amplifier, illustrated in FIGURE 7. A series of cavities, 40–44, inclusive, is illustrated, which are coupled in series by wall openings 45. Further, a jet is applied in the direction of and aligned with the openings 45, via an opening 46 and the jet exits via opening 47. Signal input in the form of an acoustic signal is applied to an opening 48, and acoustic signal output is derived from opening 49 in cavity 44.

Consider a structure with a series of resonant elements in sequence along an axis, such as, for example, a string of cavities, FIGURE 7. Each of these cavities is tuned to the same resonant frequency $\omega_0$.

If a signal is introduced into this cavity chain, for example an acoustic signal at frequency $\omega_0$, then the chambers will resonate with maximum displacement at the aperture holes, 44, and maximum pressure at the cavity centers. Since each cavity represents some capacitance and inductance, there will be an effective time delay down the string of cavities, and the transit time of the signal will be less than the acoustic velocity.

Allowing a jet of fluid to pass through the central aperture holes, or in other appropriate places as may be desirable, will alter the propagation velocity of the signal from $a$, the acoustic velocity, to $a+v$, the forward velocity, and $a-v$, the backward velocity, where $v$ is the jet velocity. Further, the resonant frequency is altered, as follows:

$$T_1 = \text{Forward transit time} = \frac{L}{a+V}$$

$$T_2 = \text{Backward transit time} = \frac{L}{a-V}$$

$$T = T_1 + T_2 = \frac{L}{a-V} + \frac{L}{a+V} = L\frac{(a+V)+(a-V)}{a^2-V^2}$$

$$= L\frac{2a}{a^2-V^2} = \text{Resonant Period}$$

With no jet, $$\frac{1}{\omega_0} = T_0 = \frac{L}{a}; \text{ or } \omega_0 = \frac{a}{L}$$

But $$\omega = \frac{a^2-V^2}{2La} = \frac{a}{2L}\left(1-\frac{V^2}{a^2}\right) = \frac{\omega_0}{2}\left(1-\frac{V^2}{a^2}\right)$$

Clearly, resonance loses its meaning beyond values of $$\left(1-\frac{V^2}{a^2}\right)$$

which are less than zero. In the general case it will be true that $$\frac{\omega_1}{a} = \frac{(n_f+n_b)}{2}\left(1-\frac{V^2}{a^2}\right)$$

$n_f$ = number of forward turns
$n_b$ = number of backward turns so that harmonics of the fundamental frequency can also be supported.

A structure such as this differs from the open structure of FIGURE 6 in that the acoustic propagation velocity in the structure is not $a$, but some value $ka < a$ where $k < 1$.

Viewed differently, the time delay may be viewed as a travel time to the walls of the cavity, from the center line, and back. In this case, the jet must travel from the center plane of one aperture, as 40, to the center plane of the next, as 41, in one half-period. In the same time, the cavity energy fluctuates through one half cycle. If the cavity were many wavelengths in diameter, then the acoustic transit time from the jet edge to the cavity rim back to the jet would be the required jet travel time. Thus for a cavity radius of 10 $\lambda$ the jet velocity need be only $a/20$. Therefore, low velocity jets can interact with high frequency signals, and provide gain as long as a long path is provided for the acoustic signal, and an interaction region with the jet is available.

What is claimed is:

1. A pure fluid system, including
   means providing a jet of fluid immersed in a medium,
   means for impressing a signal having a frequency component $f_0$ on a boundary layer only of said jet of fluid to the exclusion of the core of said jet of fluid at an upstream location of said jet of fluid,
   said jet of fluid having a Reynolds number such that proportional amplification of impressed signal at said frequency $f_0$ occurs in said boundary layer by interaction between said boundary layer and said core,
   means for collecting signal at said frequency $f_0$ at a location downstream of said upstream location, said means including a structure for abstracting from said jet of fluid an acoustic disturbance at frequency $f_0$, said structure being resonant at said frequency $f_0$, and
   means for deriving an acoustic signal at frequency $f_0$ from said structure.

2. The combination according to claim 1 wherein said last means is located at a point of said structure where high pressure variations and low flows exist.

3. The combination according to claim 1 wherein said last means is located at a point of said structure where high flows exist and low pressure variations.

4. A pure fluid system, including
   means providing a stream of fluid,
   a series of resonant structures arranged in cascade,
   means passing said stream in coupled relation to said structures at a Reynolds number supporting coupled mode operation of said stream of fluid, and
   means impressing a fluid signal of frequency $f_0$ on said stream,
   said structures being resonant at said frequency $f_0$ and spaced along said stream suitably to enhance coupled mode operation of said stream, thereby producing an amplified version of said fluid signal of frequency $f_0$.

5. The combination according to claim 4, wherein the spacing of said resonant structures in the direction of said stream is $$1 = \frac{\omega \lambda}{2} + V_f$$

where $\omega$ is an integer and $\lambda$ is acoustic wavelength in said stream and $V_f$ is velocity of said stream.

6. In a fluid amplifier,
   nozzle means providing a laminarly flowing jet of fluid in an immersing medium, said jet of fluid having a core and an outer layer surrounding said core,
   means applying to said jet of fluid a signal disturbance capable of disturbing only said outer layer to the exclusion of said core, said signal having a frequency component $f_0$,
   means for removing said core and for collecting said outer layer,
   said last means comprising a resonant cavity having a resonant frequency $f_0$, and
   means for deriving from said resonant cavity in acoustic signal at said frequency $f_0$,
   said jet of fluid having a length of flow between said nozzle means and said resonant cavity and a Reynolds number such that amplification of acoustic signals accrues due to stream interaction.

7. In a fluid amplifier,
   nozzle means providing a laminarly flowing jet of fluid in an immersing medium,
   a collection channel for said jet of fluid located downstream of said jet of fluid to provide a gap between said nozzle means and said collection channel,
   said flow having a Reynolds number selected to provide signal enhancement of signals applied to said jet in said gap but of insufficient length to permit complete turbulence to develop,
   a resonant chamber extending transversely of said gap, and
   means applying acoustic energy having a frequency component $f_0$ to said resonant chamber,
   said resonant chamber having a length which is an odd number, including one, of quarter wavelengths at said frequency $f_0$, wherein said resonant cavity is a tube having an open end for application of the applied acoustic energy, and a closed end defining said length with respect to said gap, said tube having a width equal to the length of said gap from said nozzle means to the entrance of said collection channel.

8. The combination according to claim 7, wherein said open end is spaced from said gap by an even number of half wavelengths, including one, of said frequency $f_0$.

9. In a fluid amplifier,
nozzle means for providing a laminar stream of fluid in a medium, and
means applying an acoustic disturbance to a boundary layer only of said stream of fluid,
said stream of fluid having a Reynolds number such that disturbances are amplified in said boundary layer, and
resonance means acoustically coupled with said jet at a location therealong at which said acoustic disturbance is stably amplified without saturation effects.

10. The combination according to claim 9, wherein said resonance means is coupled to said boundary layer only and has at least one resonance frequency equal to a frequency of said acoustic disturbance.

11. The combination according to claim 10, wherein said resonance means includes plural resonant cavities distributed along said stream.

12. In a fluid amplifier,
nozzle means for providing a laminar stream of fluid in a medium, and
means applying an acoustic disturbance to a boundary layer only of said stream of fluid,
said stream of fluid having a Reynolds number such that disturbances are amplified in said boundary layer, and
resonance means acoustically coupled with said jet at a location therealong at which said acoustic disturbance is stably amplified without saturation effects,
wherein said resonance means is coupled to said boundary layer only and has at least one resonance frequency equal to a frequency of said acoustic disturbance,
wherein said resonance means includes plural resonant cavities distributed along said stream, and
wherein said plural resonant cavities are located in a common wall, and wherein said laminar stream of fluid is directed along said wall, said boundary layer being located adjacent said wall.

13. The combination according to claim 11, wherein said resonant cavities surround said jet of fluid and are spaced along said jet of fluid such that said jet of fluid passes through said resonant cavities in succession.

References Cited

UNITED STATES PATENTS

| | | | |
|---|---|---|---|
| 2,755,767 | 7/1956 | Levavasseur | 137—81.5 XR |
| 3,182,674 | 5/1965 | Horton | 137—81.5 |
| 3,228,410 | 1/1966 | Warren et al. | 137—81.5 |
| 3,233,522 | 2/1966 | Stern | 137—81.5 |
| 3,234,955 | 2/1966 | Auger | 137—81.5 |
| 3,269,419 | 8/1966 | Dexter | 137—81.5 |
| 3,272,215 | 9/1966 | Bjornsen et al. | 137—81.5 |
| 3,273,377 | 9/1966 | Testerman et al. | 137—81.5 XR |
| 3,275,015 | 9/1966 | Meier | 137—81.5 |
| 3,282,051 | 11/1966 | Unfried | 137—81.5 XR |
| 3,340,884 | 9/1967 | Warren et al. | 137—81.5 |
| 3,398,758 | 8/1968 | Unfried | 137—81.5 |

SAMUEL SCOTT, Primary Examiner